Figure 3:
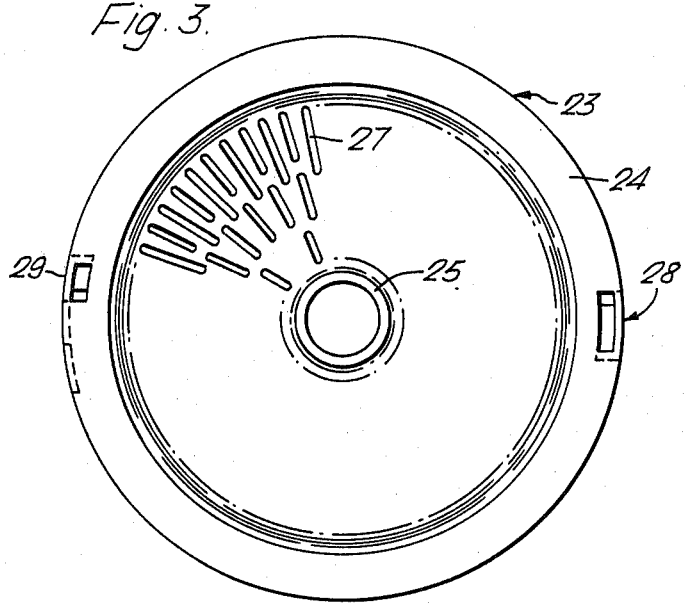

United States Patent [19]

McClean

[11] 4,240,338
[45] Dec. 23, 1980

[54] CITRUS JUICER ATTACHMENT FOR FOOD PROCESSOR

[75] Inventor: John W. McClean, Lakemba, Australia

[73] Assignee: Breville Holdings Pty. Limited, Pyrmont, Australia

[21] Appl. No.: 62,739

[22] Filed: Aug. 1, 1979

[30] Foreign Application Priority Data

Aug. 25, 1978 [AU] Australia ................ PD5664/78

[51] Int. Cl.³ .................................................. A23N 1/00
[52] U.S. Cl. ............................................ 99/501; 99/503; 241/92
[58] Field of Search ................................. 99/501–508; 241/92, 282.1; 366/206, 601

[56] References Cited

U.S. PATENT DOCUMENTS

| | | | |
|---|---|---|---|
| 1,886,092 | 11/1932 | Graham | 99/503 |
| 3,623,523 | 11/1971 | Meyer et al. | 99/503 |
| 3,892,365 | 7/1975 | Verdun | 241/92 |

FOREIGN PATENT DOCUMENTS

| | | | |
|---|---|---|---|
| 685987 | 1/1953 | United Kingdom | 99/503 |
| 721007 | 3/1954 | United Kingdom | 99/503 |

Primary Examiner—Harvey C. Hornsby
Assistant Examiner—Timothy F. Simone
Attorney, Agent, or Firm—Murray and Whisenhunt

[57] ABSTRACT

An improved food processor including a citrus fruit juice extraction unit, and an attachment for a food processor for the extraction of juice from citrus fruit, are disclosed. The attachment consists of an annular trough-like member fitting within the cylindrical food processing container amounted on the base of the food processor. The annular trough-like member has a circumferential flange which rests on the upper edge of the container and supports the trough-like member therein. The trough-like member has apertures in the bottom thereof to permit the passage of citrus fruit juice while restraining passage of pulp and pips associated with the juice. The trough-like member includes means such as a cam which are arranged to cooperate with an electric switch for the food processor motor so that the food processor motor cannot be actuated without the trough-like member being in predetermined rotational relationship with the food processor base and food processing container located thereon.

8 Claims, 4 Drawing Figures

U.S. Patent    Dec. 23, 1980    Sheet 1 of 2    4,240,338
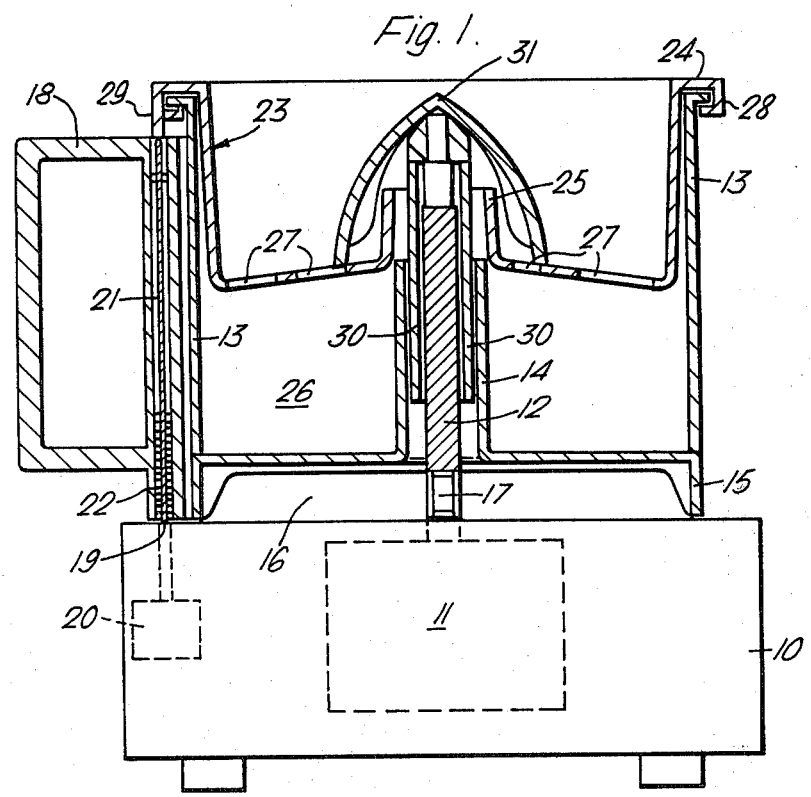
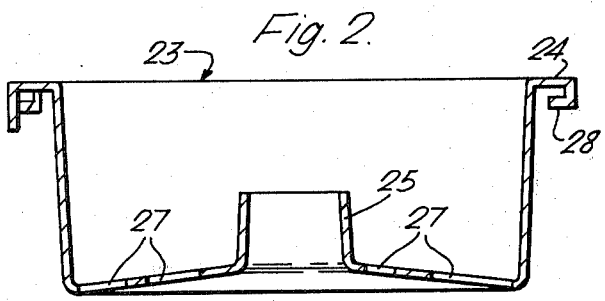

CITRUS JUICER ATTACHMENT FOR FOOD PROCESSOR

The present invention relates to an improved food processor and to an attachment for a food processor making it suitable for the extraction of juice from citrus fruit.

A variety of food processors are available and are very effective for various types of slicing, chopping and mixing of foodstuffs and the object of the present invention is to provide a device that may be incorporated into such a food processor whereby the food processor can be used additionally for the extraction of juice from citrus fruit.

The invention consists in a food processor consisting of a base containing an electric driving motor and electric switch means for controlling the operation of said driving motor, and aperture in the upper surface of said base through which a driving shaft from said motor projects, a substantially cylindrical food processing container open at its upper end, complementary means on said base and said container whereby said container is removably attached to the upper surface of said base with the driving motor shaft projecting through the hole in the base of the container, a sleeve in said container surrounding said hole and projecting upwardly into the container to form an annular liquid containing well around said hole, externally accessible means on said base associated with said electric switch means, characterised in that there is provided an annular trough like member fitting within said container, a circumferential flange of said trough like member resting on the upper edge of the container and supporting the member within the container, a central hole in said member fitting over said sleeve, apertures in the bottom of said member constructed to permit the passage of the juice of citrus fruit while acting to restrain the passage of pulp and pips associated therewith, means on said annular member arranged to co-operate with said externally accessible means whereby, unless said annular member is moved rotationally about its axis into a predetermined relationship with the base, the said electric switch means can not be actuated, complementary means on the flange of the annular member and the container acting to hold the member to the container when in said relationship, a hollow stem extending through the central hole of the said annular member and making driving connection with the motor shaft and a domed ribbed citrus juice extracting member on the upper end of said shaft said domed citrus juice extracting member covering the central hole in the bottom of the member.

The invention further consists in an attachment for a food processor consisting of a base containing an electric driving motor and electric switch means for controlling the operation of said driving motor, an aperture in the upper surface of said base through which the driving shaft from said motor projects, a substantially cylindrical food processing container, complementary means on said base of said container whereby said container is removably attached to the upper surface of said base with the driving motor shaft projecting through the hole in the base of the container, a sleeve in said container surrounding said hole and projecting upwardly into the container to form an annular liquid containing well around said hole, externally accessible means on said base associated with said electric switch means, the attachment comprising an annular trough like member adapted to fit within said container, a circumferential flange of said trough like member being adapted to rest on the upper edge of the container to support the said member within the container, a central hole in said member to fit over said sleeve, apertures in the bottom of said member to permit the passage of the juice of citrus fruit while acting to restrain the passage of pulp and pips associated therewith, means on said member arranged to co-operate with said externally accessible means whereby, unless said annular member is moved rotationally about its axis into a predetermined relationship with the base, the said electric switch means cannot be actuated, means on the flange of the member arranged to co-operate with complementary means on the container to act to hold the member to the container when in said relationship, a hollow stem extending through the central hole of said annular member, means at the lower end thereof adapted to make driving connection with the motor shaft and a domed ribbed citrus juice extracting member on the upper end of said shaft said domed citrus juice extracting member covering the central hole in the bottom of the member.

Figure 4:
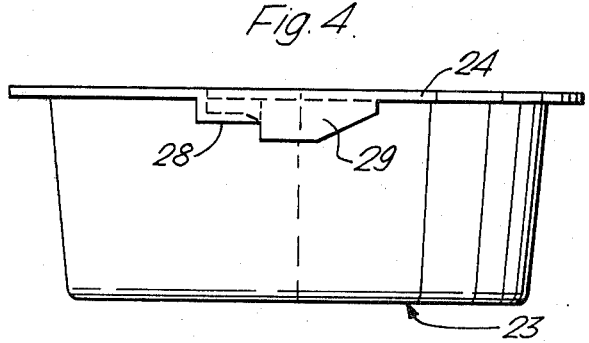

In order that the nature of the invention may be better understood a preferred form thereof is hereinafter described by way of example with reference to the accompanying drawings:

FIG. 1 is a sectional elevation showing a food processor incorporating the invention, FIG. 2 is a view in elevation of the annular trough like member, FIG. 3 is a plan view thereof, and FIG. 4 is a side elevation thereof.

The food processor illustrated consists of a base 10 which contains an electric motor 11 the driving shaft 12 of which projects upwardly through a hole in the surface of the base. Processing of food is carried out within a cylindrical container 13 having a central sleeve 14 surrounding a hole in its bottom which defines an annular liquid containing well with the interior of the container. The container is operably connected to the base by means of the depending skirt 15 around the bottom of the container which fits over an upstanding boss on the upper surface of the base. Complementary connection means 17 are provided on the skirt 15 and the boss 16 so that when the container is in a particular relationship with the base it is held to the base against upward movement away from the base.

The container 13 has attached to it an external handle 18 which enables it not only to be lifted and manipulated but also enables it to be rotated about the driving shaft 12 of the motor 11 so as to engage the parts of the complementary connection means 17 on the container and on the base.

A hole 19 in the upper surface of the base gives access to an electric switch 20 which controls the operation of the motor. A spring loaded plunger 21 is arranged between the handle 18 and the external wall of the container 18 and is arranged so that when the container is locked to the base the plunger 21 overlies the hole 19 in the base and if pressed down against the spring 22 will actuate the switch 20 in the base and start the electric motor 11. Until the container 13 is in the correct position in relation to the base the plunger 21 cannot be pushed down and the motor 11 cannot be started.

All the parts described above are known and constitute parts of food processors sold under a variety of names one particular model being sold under the trade mark "KITCHEN WIZZ".

Attachments provided by the present invention consist of an annular trough like member 23 which fits within the container 13. This has a circumferential flange 24 that overlies the upper edge of the container 13 and a central sleeve 25 that overlies the sleeve 14 in the container 12. The depth of the annular trough like member 23 is less than the depth of the container 13 leaving a space 26 below the member 23 for the collection of citrus juice. The bottom of the trough like member 23 has apertures 27 in it of such a size and configuration as to allow citrus juice to pass readily through them while retaining pips and pulp associated with the juice.

The circumferential flange 24 on the trough like member 23 and the upper edge of the container 13 are provided with co-operating connection means 28 arranged so that when the member 23 has been placed in the container 13 it may be rotated relative to it to inter-engage the connecting means 28 and prevent the member from being removed from the container. The circumferential flange 24 also provides at one point with a member 29 having on its under side a sloping cam face which is arranged to make contact with the upper end of the spring loaded plunger 21 and is arranged so that when the trough like member 23 is rotated to a position as shown in FIG. 1 in which the complementary engaging means 28 are engaged the plunger is depressed by the member 29 to make contact with the electric switch 20 and start the electric motor 11. Operation of the electric motor 11 may thus be controlled by rotation of the trough like member 23 in relation to the container 13.

A domed ribbed citrus juice extracting member 31 of conventional form is provided at the upper end of a hollow stem 30 the lower end of which fits over the motor drive shaft 12 and makes driving connection with it. The apparatus is used in a conventional manner in which citrus fruits are cut in half and pressed on to the domed citrus juice extracting member 31.

The apparatus is made for the most part by moulding from plastic material of suitable characteristics and is contructed so as to be capable of being readily dismantled for washing and storage.

The invention may be regarded either as an improved food processor having a citrus juice extracting facility or alternatively as a citrus juice extracting attachment for a food processor of a known kind.

The embodiment of the invention described above is given by way of example only as constituting a preferred form of the invention defined broadly above.

I claim:

1. A food processor consisting of a base containing an electric driving motor and electric switch means for controlling the operation of said driving motor, an aperture in the upper surface of said base through which a driving shaft from said motor projects, a substantially cylindrical food processing container open at its upper end, complementary means on said base and said container whereby said container is removably attached to the upper surface of said base with the driving motor shaft projecting through the hole in the base of the container, a sleeve in said container surrounding said hole and projecting upwardly into the container to form an annular liquid containing well around said hole, externally accessible means on said base associated with said electric switch means, characterized in that there is provided an annular trough like member fitting within said container, a circumferential flange of said trough like member resting on the upper edge of the container and supporting the member within the container, a central hole in said member fitting over said sleeve, apertures in the bottom of said member constructed to permit the passage of the juice of citrus fruit while acting to restrain the passage of pulp and pips associated therewith, means on said member arranged to cooperate with said externally accessible means and said electric switch means so that said electric switch means can be actuated only if said container is attached to said base and said annular trough like member is in a predetermined rotational relationship with said container, complementary means on the flange of the annular member and the container acting to hold the member to the container when in said relationship, a hollow stem extending through the central hole of the said annular member and making driving connection with the motor shaft and a domed ribbed citrus juice extracting member on the upper end of said shaft said domed citrus juice extracting member covering the central hole in the bottom of the member.

2. A food processor as claimed in claim 1 including means whereby when the said annular member is in said predetermined relationship said electric switch means is actuated.

3. A food processor as claimed in claim 1 wherein there is a second aperture on the upper surface of said base giving access to the electric switch means, a vertically moveable spring loaded plunger being provided on the side of said container such that when juxtaposed with said second aperture, downward movement of said plunger actuates the electric switch means, and wherein the said means on said annular member acts to depress said plunger when said annular member is in said predetermined position.

4. A food processor as claimed in claim 1 wherein said domed ribbed citrus juice extracting member is axially amounted on the upper end of said shaft, and is engageable with digitally held citrus fruit.

5. An attachment for a food processor consisting of a base containing an electric driving motor and electric switch means for controlling the operation of said driving motor, an aperture in the upper surface of said base through which the driving shaft from said motor projects, a substantially cylindrical food processing container, complementary means on said base of said container whereby said container is removably attached to the upper surface of said base with the driving motor shaft projecting through the hole in the base of the container, a sleeve in said container surrounding said hole and projecting upwardly into the container to form an annular liquid containing well around said hole, externally accessible means on said base associated with said electric switch means, the attachment comprising an annular trough like member adapted to fit within said container, a circumferential flange of said trough like member being adapted to rest on the upper edge of the container to support the said member within the container, a central hole in said member to fit over said sleeve, apertures in the bottom of said member to permit the passage of the juice of citrus fruit while acting to restrain the passage of pulp and pips associated therewith, means on said member arranged to cooperate with said externally accessible means and said electric switch means so that said electric switch means can be actuated only if said container is attached to said base and said annular trough like member is in a predetermined rotational relationship with said container, means on the flange of the member arranged to cooperate with complementary means on the container to act to hold the member to the container when in said relationship, a hollow stem extending through the central hole of said annular member, means at the lower end thereof adapted to make driving connection with the motor shaft and a domed ribbed citrus juice extracting member on the upper end of said shaft said domed citrus juice extracting member covering the central hole in the bottom of the member.

6. An attachment for a food processor as claimed in claim 5 including means whereby when the said annular member is in said predetermined relationship said electric switch means is actuated.

7. An attachment for a food processor as claimed in claim 4 wherein there is a second aperture on the upper surface of said base giving access to the electric switch means, a vertically moveable spring loaded plunger being provided on the side of said container such that when juxtaposed with said second aperture, downward movement of said plunger actuates the electric switch means, and wherein the said means on said annular member acts to depress said plunger when said annular member is in said predetermined position.

8. An attachment for a food processor consisting of a base containing an electric driving motor and electric switch means for controlling the operation of said driving motor, an aperture in the upper surface of said base through which the driving shaft from said motor projects, a substantially cylindrical food processing container, complementary means on said base of said container whereby said container is removably attached to the upper surface of said base with the driving motor shaft projecting through the hole in the base of the container, a sleeve in said container surrounding said hole and projecting upwardly into the container to form an annular liquid containing well around said hole, externally accessible means on said base associated with said electric switch means, the attachment comprising an annular trough like member adapted to fit within said container, a circumferential flange of said trough like member being adapted to rest on the upper edge of the container to support the said member within the container, a central hole in said member to fit over said sleeve, apertures in the bottom of said member to permit the passage of the juice of citrus fruit while acting to restrain the passage of pulp and pips associated therewith, means on said member arranged to cooperate with said externally accessible means and said electric switch means so that said electric switch means can be actuated only if said container is attached to said base and said annular trough like member is in a predetermined rotational relationship with said container, means on the flange of the member arranged to cooperate with complementary means on the container to act to hold the member to the container when in said relationship, a hollow stem extending through the central hole of said annular member, means at the lower end thereof adapted to make driving connection with the motor shaft and domed ribbed citrus juice extracting means axially mounted on the upper end of said shaft, said extracting member covering the central hole in the bottom of said member, and being engageable with digitally held citrus fruit.

* * * * *